Feb. 16, 1960 P. SCHMIDT 2,925,072
POWER PLANT WITH ONE CYLINDER AND AIRBORNE PISTON
Filed Dec. 21, 1953 3 Sheets-Sheet 1

Inventor:
P. Schmidt
By Hazard Downing Seebold
Attys.

Inventor:
P. Schmidt

United States Patent Office 2,925,072
Patented Feb. 16, 1960

2,925,072

POWER PLANT WITH ONE CYLINDER AND AIRBORNE PISTON

Paul Schmidt, Munich, Germany

Application December 21, 1953, Serial No. 399,371

Claims priority, application Germany April 15, 1953

2 Claims. (Cl. 123—46)

The present invention relates to improvements in jet propulsion engines of the kind wherein there is provided a gas compression cylinder and piston therein, said piston compressing the propellent gas in the direction of a propellent gas outlet valve disposed between the cylinder and a thrust chamber. Subsequent to the ignition of the propellent gas the piston motion is reversed, causing compression of air at the other end of the cylinder, and then returned to compress a further charge of propellent gas.

According to the present invention there is provided a jet propulsion engine in which the cylinder is provided with an air inlet valve in the middle portion thereof, and a propellent gas outlet valve at the extremity of said cylinder adjacent the thrust chamber, said outlet valve being actuated by gas pressures discharged from the cylinder.

While the device is described as a jet power plant it is self-evident that it may be used as an element in a power plant such as a gas turbine, since the device of this invention generates gas flowing at a high velocity from what will be referred to as a thrust chamber or an accelerating tube. This high velocity gas may, of course, be used to drive a turbine or other form of power plant device.

An embodiment of the present invention will now be described with reference to the accompanying drawings, in which.

Figure 1:
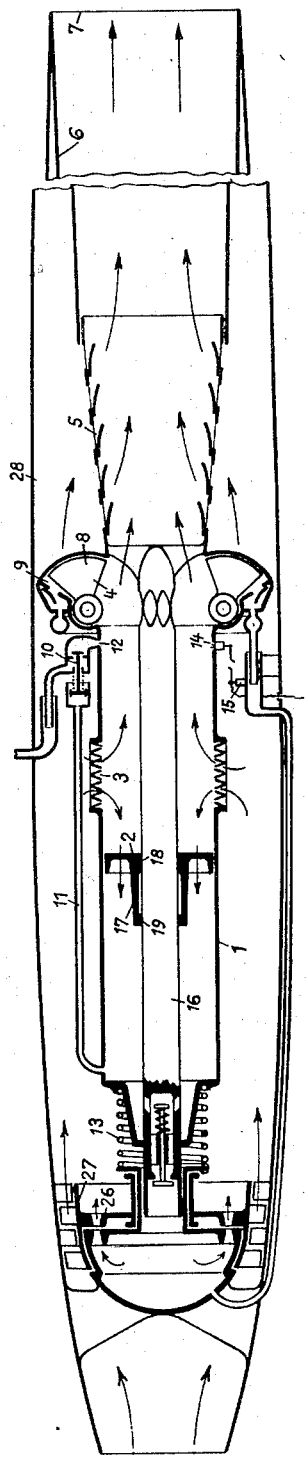
Fig. 1 represents a longitudinal section of a jet propulsion engine according to the present invention.

In Fig. 1 the piston 2 is illustrated as moving to the left within the cylinder 1. The air inlet valve 3, consisting of a back pressure flap valve is slightly offset from the center of the cylinder 1 towards the propellent gas outlet valve 4. Adjacent the valve 4, which is represented in an open position, is the air inlet valve 5 for the elongated thrust chamber 6, which valve, also represented in its open position, consists of a series of flaps. The outlet 7 of the thrust chamber is open to the atmosphere.

In the phase subsequent to that indicated in Fig. 1, the piston approaches the left end of the cylinder and is thrown back due to the resultant pressure of the compressed air at this position. Simultaneously the rotary displaceable segments 8 of the valve 4, due to the preceding compression of the air within their separate cylinder chambers 9, the formation of which will be explained later in connection with the explanation of Fig. 2, assume a rotary motion towards the cylinder outlet and close this outlet at the return stroke of the piston 2. The flap valve or air inlet means 3 will then likewise be shut. The piston 2 then compresses the air which has previously entered the cylinder 1 through valve 3.

The fuel valve 10 is opened when the air pressure within the left part of the cylinder acts upon the air piston and valve 10 through the pressure line 11. The fuel passes through valve 10 into the nozzle 12 and is discharged into the cylinder 1 to the right of piston 2. In order to obtain a high velocity of the piston it is necessary that the piston be of low weight, and provided with a sufficient guidance but with low friction. A guide rod 16 is provided along which the piston slides to provide the low friction guidance. The piston is mounted on a sleeve 17 provided with bushings 18 and 19.

Figure 2:
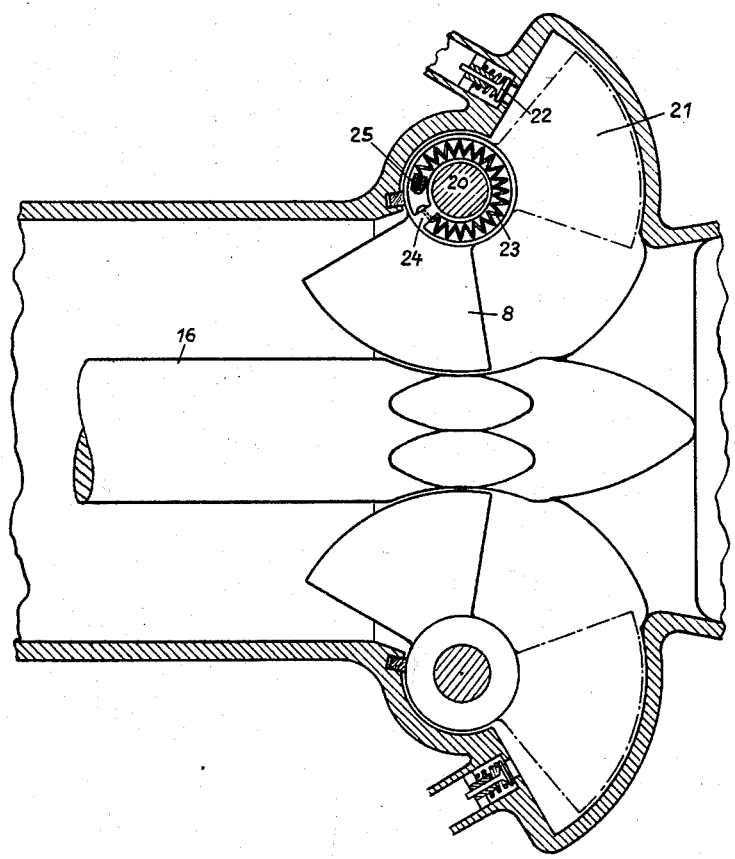
Figs. 2 and 3 show longitudinal and cross-sectional detail views, respectively, of the propellent gas outlet valve according to Fig. 1.
Figure 3:
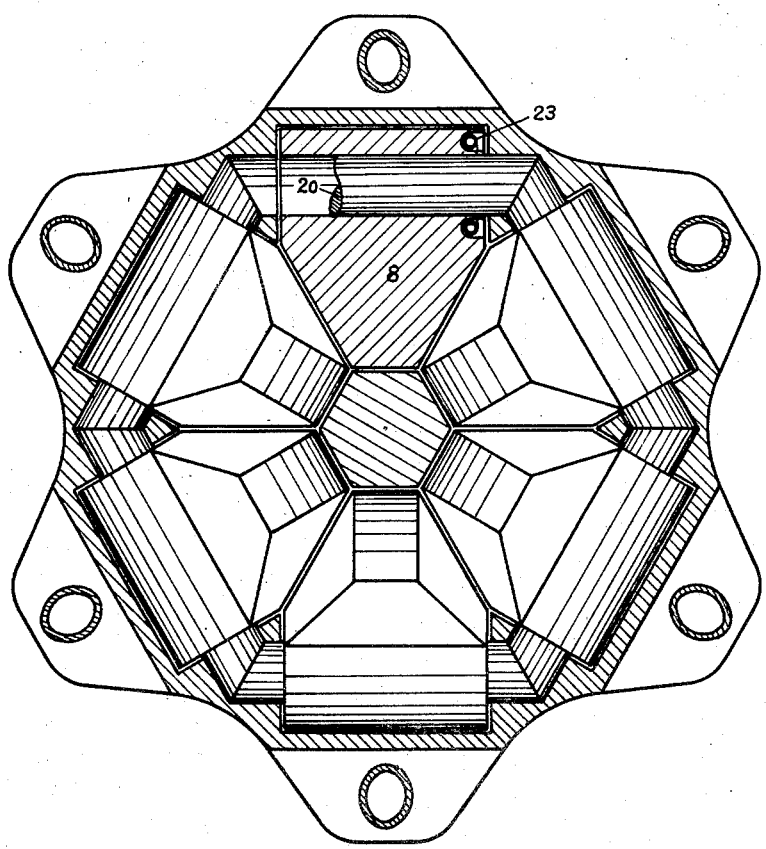

Figs. 2 and 3 show the rotary valve segments 8 pivotally mounted on bolts 20. The arrangement of several rotary segments one beside the other or one opposite the other is preferred, although a design with a single segment is possible.

Figure 2 shows the segments 8 in their most extreme closing positions. The high pressure rise developing as a result of combustion in cylinder 1 effects a speeding up of the segments 8 in the direction of their opening position which is indicated by dotted lines. With the dipping of these segments 8 into the chambers 21 formed at the circumference of the valve, the walls of which chambers are adapted to the shape of the segments 8, the gas contained in the chambers becomes highly compressed and the movement of the segments is thereby elastically arrested. Part of the enclosed gas can escape by means of a valve 22 under the high pressure developed by the swinging valve segments in order to reduce the energy of the enclosed gas, so that the return of the segments in the closing direction of the valve is performed at a lower velocity than the opening rotation, thereby allowing a longer time for the exhaust of the cylinder 1.

The reduction of energy from the separate chamber 21 makes it possible automatically to balance the relative movements of the piston and the outlet valve to take care of alterations in the operating conditions, for example, from total to partial capacity.

The segments are urged toward the closed position of the valve 4 by means of springs 23. Each spring 23 is secured at one end to an abutment 24 on the segments 8 and secured at its other end to an abutment 25 on the body of the cylinder. The cylinder 1 is installed in such a way that axial movement can occur against a spring 13 which abuts against structural parts of the jet engine. When the piston 2 moves towards the outlet valve 4, that is, to the right, the cylinder will move axially towards the left. On the cylinder there is fixed a spark plug 14, the actuating contact of which is situated outside the cylinder wall. Opposite to this contact there is disposed a fixed contact 15. The resilient ends of these contacts touch one another as soon as the movement of the piston and cylinder approach their turning point and the ignition of the propellent mixture will thereby be initiated at the top dead center of the piston motion. For operation with higher compression values of the air an ignition device is not required.

Before starting the jet engine the piston 2 is in the lower dead center position, that is, in the air compression part of the cylinder, and from this position is urged forward by the introduction of compressed air. Then due to the pressure rise caused by the ignition of the propellent gas that was compressed by motion of the piston 2, the direction of movement of the piston is reversed and outward rotary movement of the segments of the outlet valve is caused. Due to the accurate formation of the valve segment peripheries seating on the bolt 20 the outlet valve remains closed during the initial operation of the rotary motion of the segments. Meanwhile the piston 2 is highly accelerated by means of the combustion pressures and thus the expansion of the gas while at such high pressures will be essentially converted into kinetic energy of the piston mass. A small part of the energy of the gas expansion will be taken up by rotation of the valve segments of the outlet valve 4 when said segments attain a high rotation motion in the direction of their opening motion so that the required rapid opening of the valve occurs.

The thrust of the propellent gases entering the chamber 6 acts upon the air volume present within the chamber thereby accelerating said air volume to generate a pressure surge or compression shock.

The shape of chamber 6 is tapered outwardly so as to produce a desired low pressure at valve 4 so that scavenging of the combustion gases from the cylinder will be assured.

Figure 4:
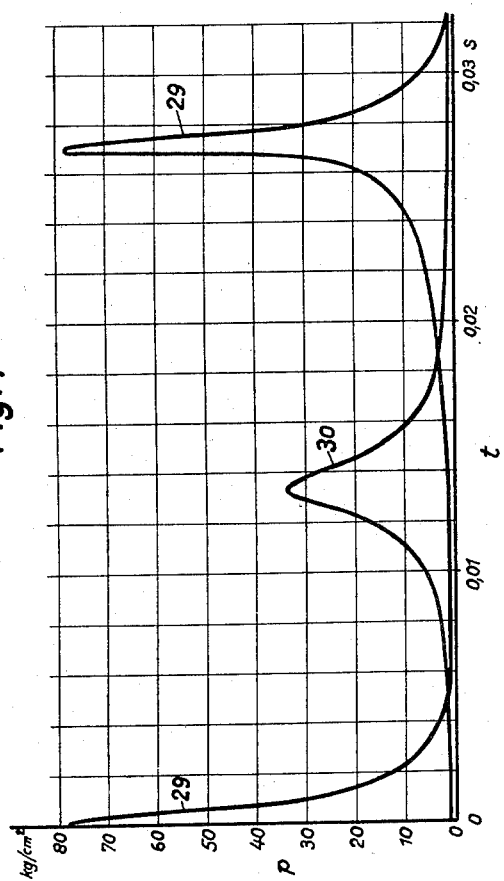
Figure 4 shows a graph wherein the pressure of the propellent gas and the pressure of the air within the cylinder have been plotted against time.

The characteristics of the design according to the invention can be seen from the diagrams of Fig. 4 taken by means of oscillographs showing the chronological course of the pressure changes within the cylinder of a jet power plant. Curve 29 indicates the pressure of the propellent gas, and curve 30 indicates the pressure of the air compressed at the opposite cylinder end. The piston velocities in these tests were only about 50 meters per second, whereas in other tests there have been attained up to 80 meters per second. Since it will be possible by means of the invention to attain a piston velocity of more than 100 meters per second, the time values of Figure 4 do not represent the most favorable operation that can be attained, but they show at least in how short periods the accelerations of the piston and valve volumes will be attained, and in how short a period the transfer of the pressure of the burned propellent gases will be obtained by means of the propellent gas-outlet valve. The maximum pressure of the combustion of approximately 80 kg. per cm.$^2$ has been measured in other tests as being more than 100 kg. per cm.$^2$.

It is desirable, especially when the jet engine is operated at high altitudes, to compress the atmospheric air before its introduction into the cylinder. For this purpose the air which has been compressed by the return stroke of the piston 2 within the cylinder 1 is, by operation of the illustrated back pressure valve, partly conducted to an air turbine 26 mounted together or coupled with a rotating air compressor 27, and the air thereby compressed is then partially introduced into the cylinder of the engine.

The periodic air consumption of the cylinder and thrust chamber have unfavorable effects on the outer resistance of the engine especially when utilised for high flight velocities.

Since the jet engine according to the present invention, due to its low structural weight and its high efficiency, is specially suitable for velocities above the Mach No. 1, the cylinder and thrust chamber are encased by the wall of a storage chamber 28 open at its front end to the atmosphere. The storage chamber 28 has a large air volume compared with the cylinder 1 and chamber 6, and will therefore at only low pressure fluctuations compensate for the periodical withdrawal of air by the cylinder and chamber 6, so that the air at the front end of the storage chamber flows in practically continuously.

By means of the intake compressor, especially at supersonic speed, the static pressure is then transferred at high efficiency to the air volume within the storage chamber. It will be appreciated, however, that when the device of the present invention is to be used at slow speeds with respect to the surrounding atmosphere, some design changes will be required that need not be illustrated to exemplify this invention.

Having thus fully described the invention what is claimed and desired to be secured by Letters Patent is:

1. A gas generator comprising a hollow cylinder, one end of which constitutes a variable volume compression chamber, and the other end of which constitutes a variable volume combustion chamber, a freely movable piston in said cylinder separating said combustion and said compression chambers, air inlet means adjacent the mid-length of said cylinder, and a gas outlet valve at the end of said combustion chamber, and in which the gas outlet valve comprises a plurality of segmental valve elements pivoted about the periphery of said cylinder, and a complementary chamber for each of said segmental valve elements so positioned beyond the end of said cylinder upon said segmental valve elements entering therein as they pivot to valve open position gas is compressed in said chambers to form a cushion to arrest the motion of the valve elements and to assist in returning said valve elements to closed position.

2. The gas generator of claim 1, in which a valve is provided in each of the plurality of complementary chambers to bleed off a portion of the gas compressed therein.

References Cited in the file of this patent

UNITED STATES PATENTS

| | | |
|---|---|---|
| 1,277,779 | Titus | Sept. 3, 1918 |
| 2,115,921 | Steiner | May 3, 1938 |
| 2,124,462 | Cummings | July 19, 1938 |
| 2,342,262 | Franz et al. | Feb. 22, 1944 |
| 2,352,891 | Graves | July 4, 1944 |
| 2,398,221 | Gerhardt | Apr. 9, 1946 |
| 2,407,790 | Tourneau | Sept. 17, 1946 |
| 2,427,845 | Forsyth | Sept. 23, 1947 |
| 2,486,967 | Morrisson | Nov. 1, 1949 |
| 2,526,645 | Edelman | Oct. 24, 1950 |
| 2,597,253 | Melchior | May 20, 1952 |
| 2,659,194 | Huber | Nov. 17, 1953 |
| 2,677,232 | Collins | May 4, 1954 |

FOREIGN PATENTS

| | | |
|---|---|---|
| 558,113 | Germany | Sept. 1, 1932 |
| 283,880 | Switzerland | Oct. 16, 1952 |